United States Patent
Eistein et al.

(10) Patent No.: US 12,348,337 B2
(45) Date of Patent: Jul. 1, 2025

(54) PRECODER ESTIMATION

(71) Applicant: QUALCOMM Incorporated, San Diego, CA (US)

(72) Inventors: Yaniv Eistein, Tel Aviv (IL); Ronen Shaked, Kfar Saba (IL); Aviv Regev, Tel Aviv (IL); Lev Zavurov, Yeruham (IL)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/059,041

(22) Filed: Nov. 28, 2022

(65) Prior Publication Data

US 2024/0179032 A1 May 30, 2024

(51) Int. Cl.
*H04L 25/02* (2006.01)
*H04L 5/00* (2006.01)

(52) U.S. Cl.
CPC ........ *H04L 25/0228* (2013.01); *H04L 5/0048* (2013.01)

(58) Field of Classification Search
CPC ............. H04L 25/0224; H04L 25/0228; H04L 5/0048
See application file for complete search history.

(56) References Cited

U.S. PATENT DOCUMENTS

| | | | | |
|---|---|---|---|---|
| 2011/0045782 A1* | 2/2011 | Shin | ..................... | H04B 7/0639 455/67.13 |
| 2012/0314787 A1* | 12/2012 | Park | ..................... | H04B 7/0417 375/260 |
| 2013/0107746 A1* | 5/2013 | Wang | ................ | H04L 25/03343 370/252 |
| 2014/0169208 A1* | 6/2014 | Li | ......................... | H04L 65/611 370/252 |
| 2015/0030006 A1* | 1/2015 | Fujio | .................... | H04B 7/0456 370/336 |
| 2015/0280801 A1* | 10/2015 | Xin | ....................... | H04L 5/0048 370/329 |
| 2017/0290013 A1* | 10/2017 | McCoy | ................. | H04L 5/0007 |
| 2017/0373743 A1* | 12/2017 | Park | ..................... | H04L 25/0224 |
| 2018/0091341 A1* | 3/2018 | Sadiq | .................... | H04L 5/0053 |

(Continued)

OTHER PUBLICATIONS

"Enhanced Channel Estimation and Codebook Design for Millimeter-Wave Communication"; Xiao et al., IEEE Transactions on Vehicular Technology, vol. 67, No. 10, Oct. 2018 (Year: 2018).*

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, an indication of a slot to be associated with precoder estimation, the indication of the slot including an indication of a first precoder and one or more parameters associated with the slot. The UE may receive, from the network node and during the slot, a first one or more reference signals associated with estimating a physical channel using the first precoder and a second one or more reference signals associated with estimating a second precoder using the estimated physical channel. The UE may receive, from the network node, one or more signals based on the second precoder. Numerous other aspects are described.

30 Claims, 10 Drawing Sheets

(56) References Cited

U.S. PATENT DOCUMENTS

| | | | |
|---|---|---|---|
| 2018/0295631 A1* | 10/2018 | Fröberg Olsson ... | H04B 7/0658 |
| 2018/0323846 A1* | 11/2018 | Tsai .................... | H04B 7/0617 |
| 2019/0052322 A1* | 2/2019 | Akkarakaran ....... | H04B 17/345 |
| 2019/0199552 A1* | 6/2019 | Liu ....................... | H04L 5/0048 |
| 2019/0261336 A1* | 8/2019 | Liu ........................ | H04L 5/005 |
| 2020/0099488 A1* | 3/2020 | Kim ..................... | H04B 7/063 |
| 2020/0186303 A1* | 6/2020 | Hao ..................... | H04B 7/0626 |
| 2020/0195318 A1* | 6/2020 | Akkarakaran ........ | H04W 72/21 |
| 2020/0259610 A1* | 8/2020 | Malek-Mohammadi .................... H04L 5/0048 | |
| 2020/0413488 A1* | 12/2020 | Han ..................... | H04L 5/0051 |
| 2021/0160026 A1* | 5/2021 | Wang ............... | H04W 72/0446 |
| 2021/0281368 A1* | 9/2021 | Jeon ..................... | H04L 5/0048 |
| 2021/0336667 A1* | 10/2021 | Bengtsson ........... | H04B 7/0469 |
| 2022/0140970 A1* | 5/2022 | Saggar .................. H04W 72/20 370/329 | |
| 2023/0216712 A1* | 7/2023 | Yao ..................... | H04L 5/0051 |
| 2023/0318177 A1* | 10/2023 | Zhou ................... H04L 25/0204 455/456.1 | |
| 2023/0344488 A1* | 10/2023 | Bhat ................... | H04B 7/0626 |
| 2023/0379020 A1* | 11/2023 | Wang .................. | H04B 7/0663 |
| 2024/0137081 A1* | 4/2024 | Kwak .................. | H04L 5/0048 |
| 2024/0179032 A1* | 5/2024 | Eistein ............... | H04L 25/0224 |
| 2024/0235627 A9* | 7/2024 | Kwak ................. | H04L 25/0224 |
| 2025/0047335 A1* | 2/2025 | Qiang ................. | H04B 7/0456 |

\* cited by examiner

PRECODER ESTIMATION

FIELD OF THE DISCLOSURE

Aspects of the present disclosure generally relate to wireless communication and to techniques and apparatuses for precoder estimation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network node, an indication of a slot to be associated with precoder estimation, the indication of the slot including an indication of a first precoder and one or more parameters associated with the slot. The one or more processors may be configured to receive, from the network node and during the slot, a first one or more reference signals associated with estimating a physical channel using the first precoder and a second one or more reference signals associated with estimating a second precoder using the estimated physical channel. The one or more processors may be configured to receive, from the network node, one or more signals based on the second precoder.

Some aspects described herein relate to a network node for wireless communication. The network node may include a memory and one or more processors coupled to the memory. The one or more processors may be configured to transmit an indication, for a UE, of a slot to be associated with precoder estimation, the indication of the slot including an indication of a first precoder and one or more parameters associated with the slot. The one or more processors may be configured to transmit, during the slot, a first one or more reference signals, using the first precoder, and a second one or more reference signals using a second precoder. The one or more processors may be configured to transmit, using the second precoder, one or more signals for the UE.

Some aspects described herein relate to a method of wireless communication performed by a UE. The method may include receiving, from a network node, an indication of a slot to be associated with precoder estimation, the indication of the slot including an indication of a first precoder and one or more parameters associated with the slot. The method may include receiving, from the network node and during the slot, a first one or more reference signals associated with estimating a physical channel using the first precoder and a second one or more reference signals associated with estimating a second precoder using the estimated physical channel. The method may include receiving, from the network node, one or more signals based on the second precoder.

Some aspects described herein relate to a method of wireless communication performed by a network node. The method may include transmitting an indication, for a UE, of a slot to be associated with precoder estimation, the indication of the slot including an indication of a first precoder and one or more parameters associated with the slot. The method may include transmitting, during the slot, a first one or more reference signals, using the first precoder, and a second one or more reference signals using a second precoder. The method may include transmitting, using the second precoder, one or more signals for the UE.

Some aspects described herein relate to a non-transitory computer-readable medium that stores a set of instructions for wireless communication by a UE. The set of instructions, when executed by one or more processors of the UE, may cause the UE to receive, from a network node, an indication of a slot to be associated with precoder estimation, the indication of the slot including an indication of a first precoder and one or more parameters associated with the slot. The set of instructions, when executed by one or more processors of the UE, may cause the UE to receive, from the network node and during the slot, a first one or more reference signals associated with estimating a physical channel using the first precoder and a second one or more reference signals associated with estimating a second precoder using the estimated physical channel. The set of instructions, when executed by one or more processors of the UE, may cause the UE to receive, from the network node, one or more signals based on the second precoder.

Some aspects described herein relate to a non-transitory computer-readable medium that stores a set of instructions for wireless communication by a network node. The set of instructions, when executed by one or more processors of the network node, may cause the network node to transmit an indication, for a UE, of a slot to be associated with precoder estimation, the indication of the slot including an indication of a first precoder and one or more parameters associated with the slot. The set of instructions, when executed by one or more processors of the network node, may cause the network node to transmit, during the slot, a first one or more reference signals, using the first precoder, and a second one or more reference signals using a second precoder. The set of instructions, when executed by one or more processors of the network node, may cause the network node to transmit, using the second precoder, one or more signals for the UE.

Some aspects described herein relate to an apparatus for wireless communication. The apparatus may include means for receiving, from a network node, an indication of a slot to be associated with precoder estimation, the indication of the slot including an indication of a first precoder and one or more parameters associated with the slot. The apparatus may include means for receiving, from the network node and during the slot, a first one or more reference signals associated with estimating a physical channel using the first precoder and a second one or more reference signals associated with estimating a second precoder using the estimated physical channel. The apparatus may include means for receiving, from the network node, one or more signals based on the second precoder.

Some aspects described herein relate to an apparatus for wireless communication. The apparatus may include means for transmitting an indication, for a UE, of a slot to be associated with precoder estimation, the indication of the slot including an indication of a first precoder and one or more parameters associated with the slot. The apparatus may include means for transmitting, during the slot, a first one or more reference signals, using the first precoder, and a second one or more reference signals using a second precoder. The apparatus may include means for transmitting, using the second precoder, one or more signals for the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
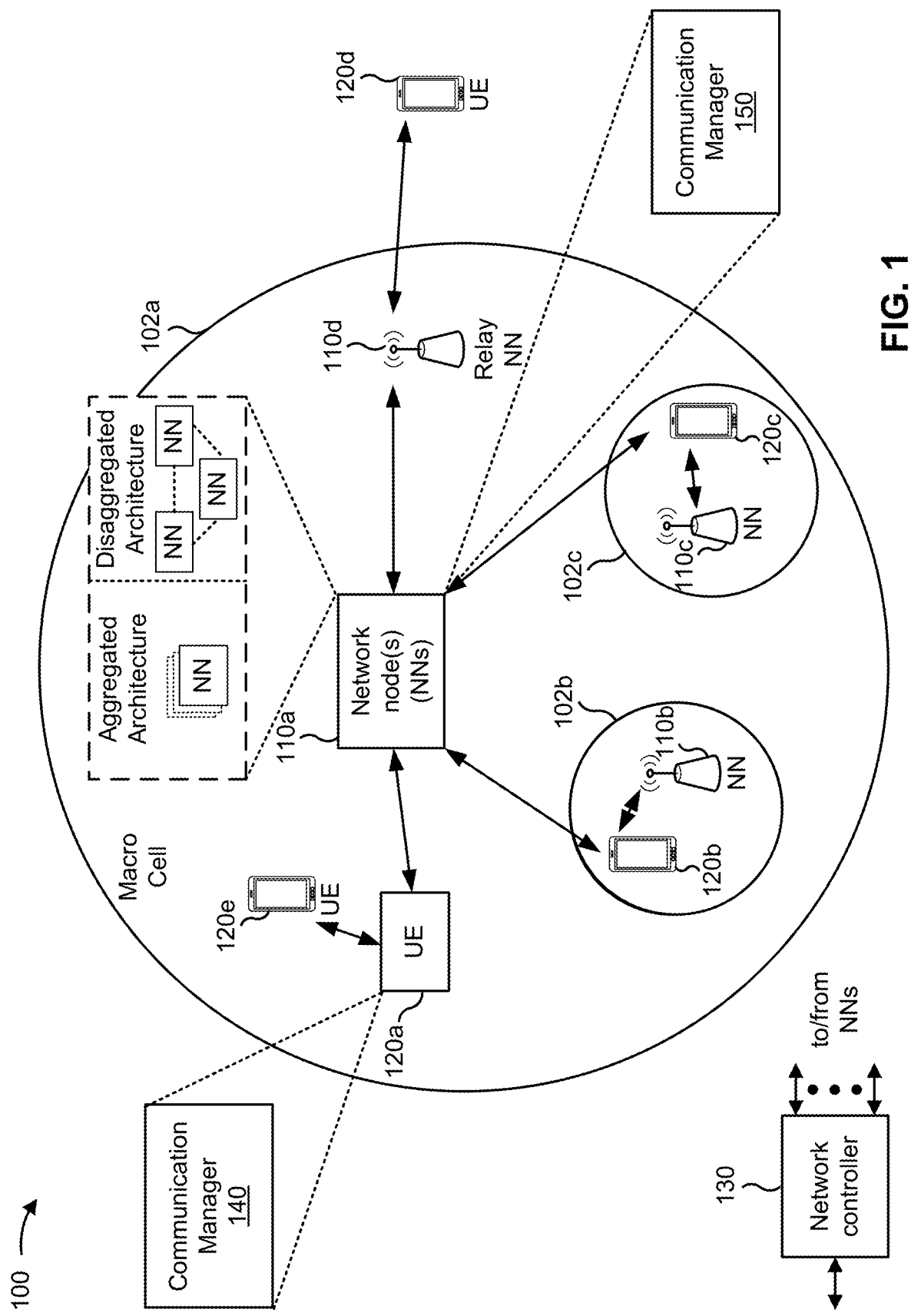
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, an indication of a slot to be associated with precoder estimation, the indication of the slot including an indication of a first precoder and one or more parameters associated with the slot; receive, from the network node and during the slot, a first one or more reference signals associated with estimating a physical channel using the first precoder and a second one or more reference signals associated with estimating a second precoder using the estimated physical channel; and receive, from the network node, one or more signals based on the second precoder. Additionally, or alternatively, the communication manager 140 may perform one or more other operations described herein.

In some aspects, the network node 110 may include a communication manager 150. As described in more detail elsewhere herein, the communication manager 150 may transmit an indication, for a UE, of a slot to be associated with precoder estimation, the indication of the slot including an indication of a first precoder and one or more parameters associated with the slot; transmit, during the slot, a first one or more reference signals, using the first precoder, and a second one or more reference signals using a second precoder; and transmit, using the second precoder, one or more signals for the UE. Additionally, or alternatively, the communication manager 150 may perform one or more other operations described herein.

As indicated above, FIG. 1 is provided as an example. Other examples may differ from what is described with regard to FIG. 1.

Figure 2:
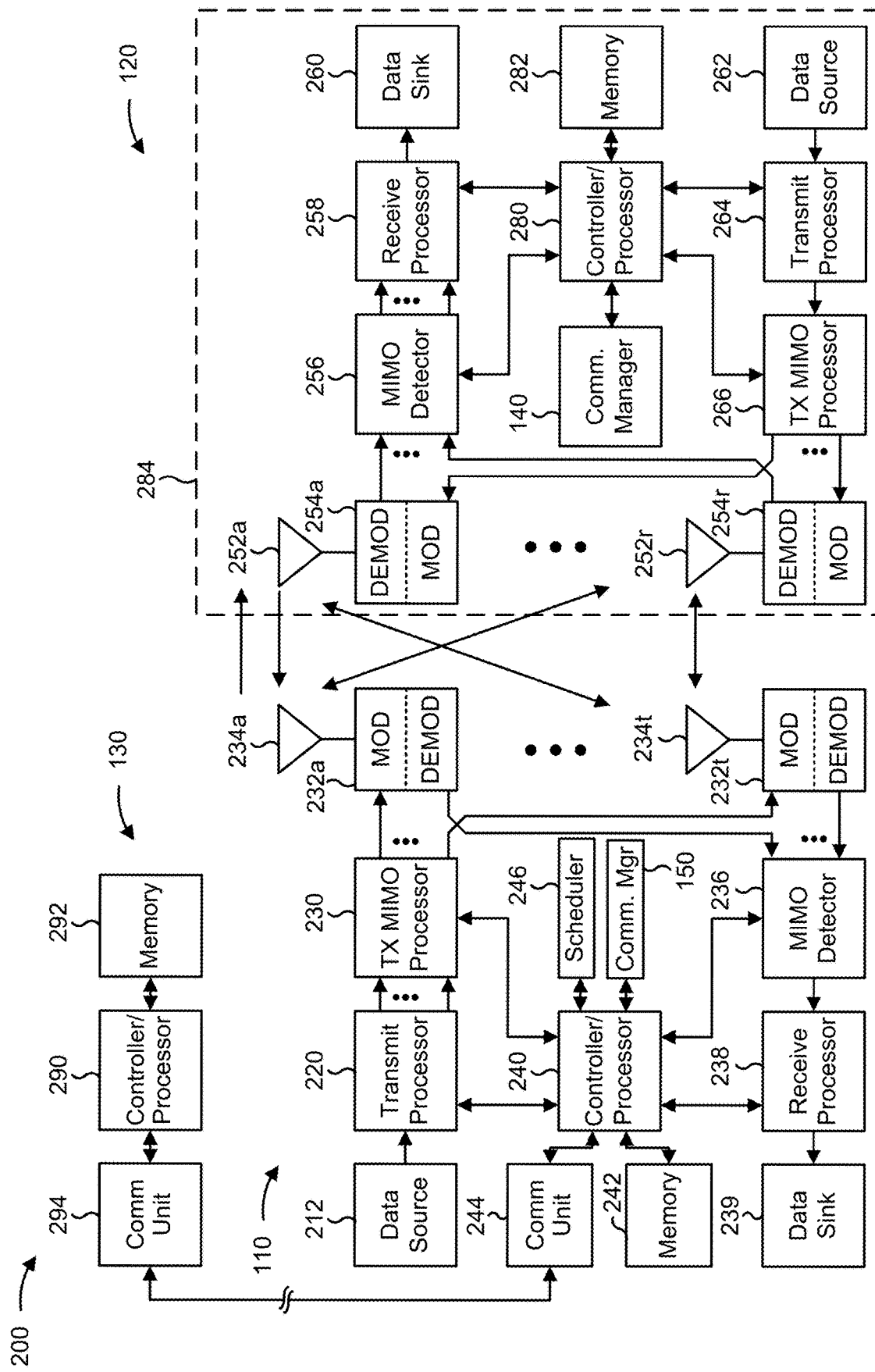
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1).

The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with precoder estimation, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network node, an indication of a slot to be associated with precoder estimation, the indication of the slot including an indication of a first precoder and one or more parameters associated with the slot; means for receiving, from the network node and during the slot, a first one or more reference signals associated with estimating a physical channel using the first precoder and a second one or more reference signals associated with estimating a second precoder using the estimated physical channel; and/or means for receiving, from the network node, one or more signals based on the second precoder. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication, for a UE, of a slot to be associated with precoder estimation, the indication of the slot including an indication of a first precoder and one or more parameters associated with the slot; means for transmitting, during the slot, a first one or more reference signals, using the first precoder, and a second one or more reference signals using a second precoder; and/or means for transmitting, using the second precoder, one or more signals for the UE. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
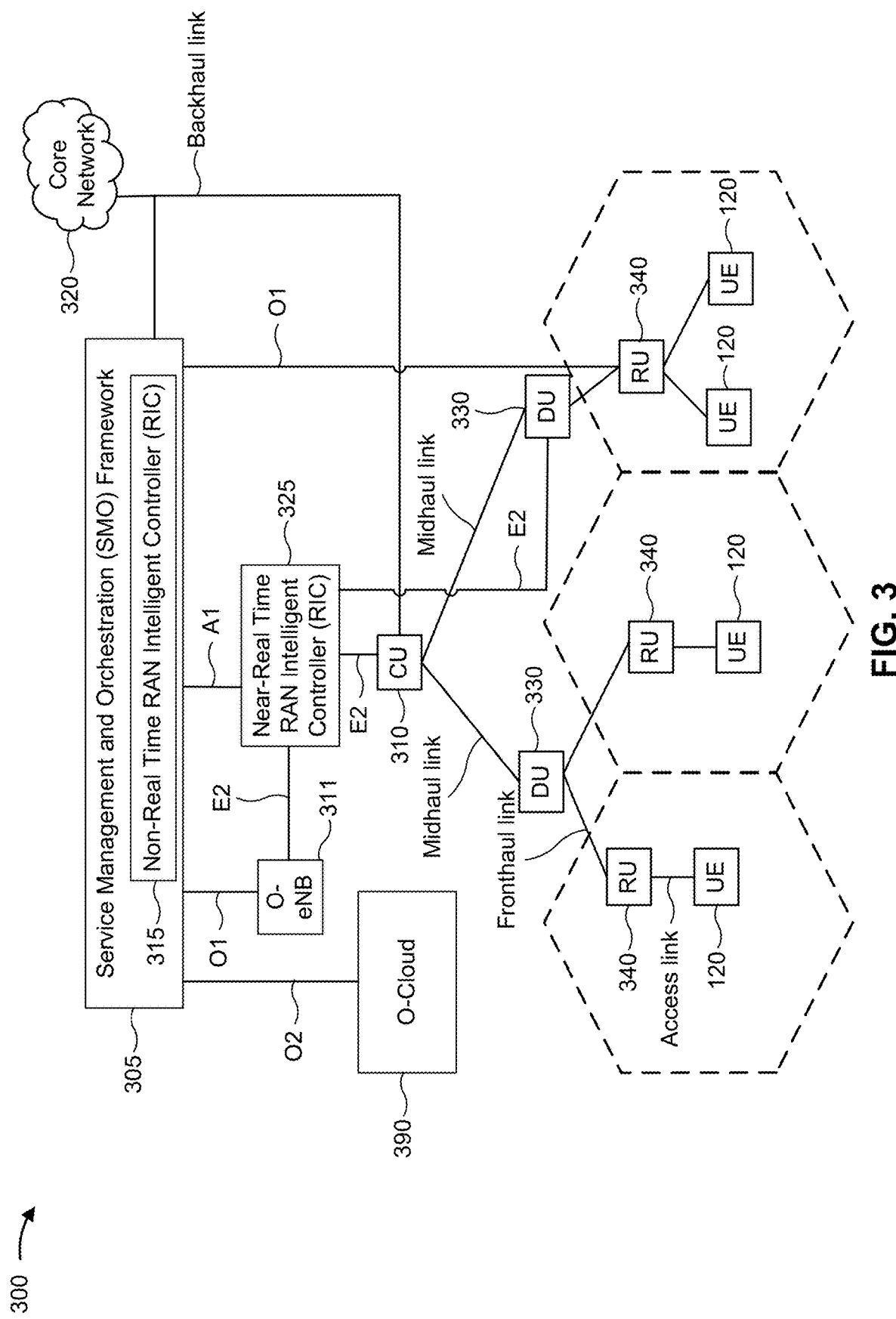
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
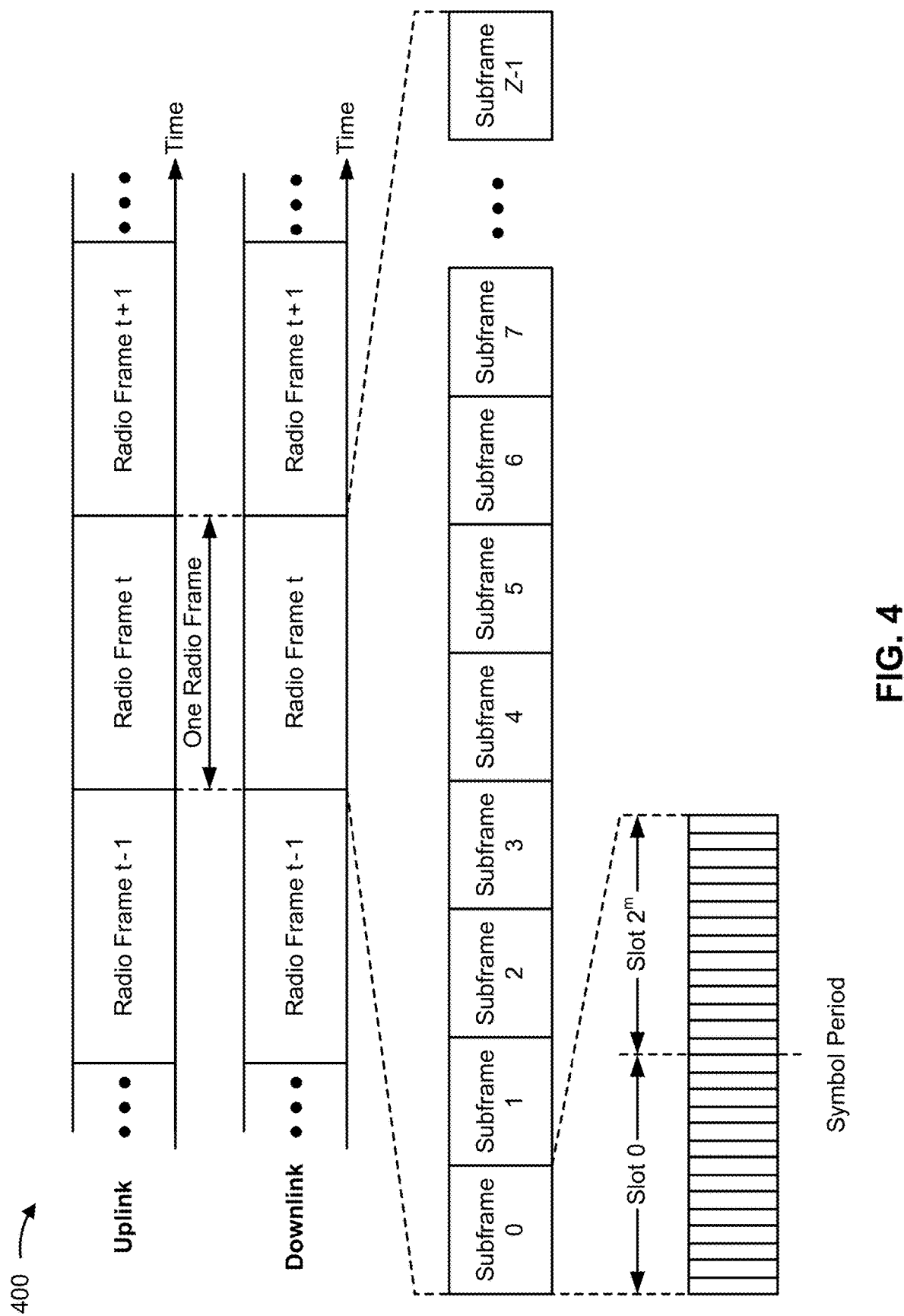
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 4, where m is an index of a numerology used for a transmission, such as 0, 1, 2, 3, 4, or another number). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 4 is provided as an example. Other examples may differ from what is described with respect to FIG. 4.

Precoding may be used, in some communications systems, to enable multi-stream transmission in multi-antenna communications with reduced utilization of computing and/or memory resources to decode a transmission by a UE. A UE may provide a precoding matrix indicator (PMI) to provide spatial channel information feedback. The precoding matrix indicator may be associated with a precoding matrix for a particular rank. "Precoder" and "precoding matrix" may be used interchangeably herein. Precoding may be a generalization of beamforming to support multi-stream (or multi-layer) transmission in multi-antenna wireless communications. In conventional single-stream beamforming, the same signal may be emitted from each of the transmit antennas with appropriate weighting (e.g., phase and gain) such that the signal power is maximized at the receiver output. When the receiver has multiple antennas, single-stream beamforming cannot simultaneously maximize the signal level at all of the receive antennas. In order to maximize the throughput in multiple receive antenna systems, a multi-stream transmission may be used. Precoding may be associated with multiple data streams that are emitted from the transmit antennas with independent and appropriate weightings such that the link throughput is maximized at the receiver output.

For example, a type II rank 1 precoding matrix may take the form:

$$W = \begin{bmatrix} \tilde{w}_{0,0} \\ \tilde{w}_{1,0} \end{bmatrix} = W_1 W_2 \qquad (1)$$

where W is normalized to 1, and represents weights that a network node is to apply to each antenna for communication. Similarly, a type II rank 2 precoding matrix may take the form:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2 \quad (2)$$

where columns of W are normalized to $1/\sqrt{2}$. In this case, a network node may determine a weighted combination of L beams as:

$$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i} \quad (3)$$

where L is a quantity of beams and may be a configured value (e.g., L∈{2,3,4}), $b_{k_1,k_2}$ represents an oversampled two-dimensional discrete Fourier transform (2D-DFT) beam, $P_{r,l,i}^{(WB)}$ represents a wideband beam amplitude scaling factor for a beam i using a polarization r and using a layer l, $p_{r,l,i}^{(SB)}$ represents a sub-band beam amplitude scaling factor, and $c_{r,l,i}$ represents a beam combining coefficient relating to a phase of a beam. In this case, polarization values for r may be limited to 0 and 1, and layer values for l may be limited to 0 and 1. However, for higher rank codebooks (i.e., rank three or higher codebooks), such as a rank 3 codebook, and/or a rank 4 codebook, among other examples, a quantity of layers l may increase to, for example, 2, and/or 3, among other examples.

To perform precoding, a transmitter (e.g., a network node) may receive channel state information (CSI). For example, a CSI reference signal (CSI-RS) may carry information used for downlink channel estimation (e.g., downlink CSI acquisition), which may be used for scheduling, link adaptation, or beam management, among other examples. A network node 110 may configure a set of CSI-RSs for a UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A UE 120 may decode a communication based at least in part on performing channel estimations. For example, a demodulation reference signal (DMRS) may carry information used to estimate a radio channel for demodulation of an associated physical channel. The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs may be used for both downlink communications and uplink communications. The estimated channel (e.g., based on a received DMRS) may represent a combination of a precoding matrix (e.g., that is used by a transmitter, such as a network node 110) and a channel matrix (e.g., a physical channel matrix). For example, a channel may be represented as Y=(H·P)·S+N, where H is the physical channel matrix, P is the precoding matrix, S is the signal (e.g., data), and N is noise. The estimation of the radio channel performed using a DMRS may be an estimation of (H·P). The UE 120 may use this estimation to perform decoding to obtain the signal (e.g., data).

In some wireless communication systems, to achieve a higher throughput, higher orders of modulation and/or an increased quantity of information layers (e.g., MIMO layers) may be used for communications. In order for a receiver to detect signals associated with higher orders of modulation that are transmitted over a high quantity of information layers, the receiver may need a low post-processing error vector magnitude (EVM). An EVM measurement may be the normalized ratio of the difference between a measured signal and an ideal or reference signal. The difference may be referred to as the error vector. The EVM may be a metric that characterizes phase coherence across bands over time. For example, a transmitting device, such as the network node 110, may transmit a signal. A receiving device, such as the UE 120, may remove a cyclic prefix (CP) from the signal, and perform a fast Fourier transform (FFT). The receiving device may perform pre-FFT or post-FFT time/frequency synchronization and symbol detection/decoding. The EVM measurement may be defined over one slot in the time domain t and over $N_{BW}^{RB}$ subcarriers in the frequency domain f such that:

$$EVM = \sqrt{\frac{\sum_{t \in T} \sum_{f \in F(t)} |Z'(t,f) - I(t,f)|^2}{\sum_{t \in T} \sum_{f \in F(t)} |I(t,f)|^2}}$$

where T is the set of symbols with the considered modulation scheme being active within the slot, F(t) is the set of subcarriers within the $N_{BW}^{RB}$ subcarriers with the considered modulation scheme being active in symbol t, I(t,f) is the ideal signal reconstructed by the measurement equipment in accordance with relevant transmission models, and Z'(t,f) is a specified modified signal under test. The modified signal Z'(t,f) may compensate for time, frequency, amplitude, and/or phase impairments. The EVM may be evaluated by the UE 120 using a modulated signal in a physical downlink shared channel (PDSCH).

The low EVM may be achieved by increasing a quantity of transmit antennas used by a transmitter, and/or increasing a transmit power of each transmit antenna, among other examples. However, increasing the quantity of transmit antennas may increase RF impairments associated with transmitted signals. For example, RF impairments may include power amplifier (PA) non-linearity (NL) of a PA of a given antenna, and/or in-phase/quadrature (I/Q) impairments, among other examples. The RF impairments may increase the EVM of signals, thereby reducing the throughput of signals transmitted over a physical channel. A receiver (e.g., a UE 120) may be enabled to estimate and/or correct such RF impairments using a channel estimation. However, it may be difficult for the receiver (e.g., the UE 120) to estimate the channel in order to estimate and/or correct such RF impairments because the receiver (e.g., the UE 120) may be unable to determine the precoder used by a transmitter (e.g., a network node 110). For example, when a non-codebook-based precoder is used by the network node 110, the network node 110 may not have any mechanism or signaling means to indicate the non-codebook-based precoder (e.g., as compared to a codebook-based precoder where the network node 110 may indicate an identifier in the codebook associated with the precoder). Additionally, estimating the non-codebook-based precoder may be difficult for the UE 120. For example, the receiver may not receive an indication of the precoder (e.g., the precoding matrix) used by the transmitter. Rather, the receiver may estimate the (H·P) of the channel (e.g., the combined precoding matrix and channel matrix). However, such estimations may not be accurate enough for sufficient estimation and/or correction of the RF impairments described above.

Some techniques and apparatuses described herein enable precoder estimation at a receiver, such as a UE 120. For example, a network node 110 may transmit, and the UE 120 may receive, an indication of a slot to be associated with precoder estimation, the indication of the slot including an indication of a first precoder and one or more parameters associated with the slot. The network node 110 may transmit, and the UE 120 may receive, a first one or more reference signals (e.g., during the slot) associated with estimating a physical channel using the first precoder, and a second one or more reference signals associated with estimating a second precoder using the estimated physical channel. In some aspects, the network node 110 may transmit, and the UE 120 may receive, one or more signals based on the second precoder.

For example, the first precoder may be a known precoder and/or a codebook-based precoder. The second precoder may be an unknown precoder and/or a non-codebook-based precoder. The slot may include one or more symbols associated with physical channel estimation. For example, during the one or more symbols, the network node 110 may transmit signals using a known (e.g., codebook-based) precoder. The UE 120 may receive the signals and may estimate the physical channel using the received signals and the known (e.g., codebook-based) precoder. The slot may include one or more symbols associated with precoder estimation. During the one or more symbols associated with precoder estimation, the network node 110 may transmit signals using an unknown (e.g., to the UE 120) or a non-codebook-based precoder. The UE 120 may receive the signals and may estimate the precoder using the estimated physical channel (e.g., estimated during the slot) and the received signals. For example, because the precoder estimation is being performed in the same slot as the physical channel estimation, a likelihood that the estimated physical channel remains the same during one or more symbols associated with precoder estimation may be improved.

As a result, the UE 120 is able to obtain an estimation of the precoder (e.g., the precoding matrix) being used by the network node 110 (e.g., when the precoder is a non-codebook-based precoder). The estimation of the (non-codebook-based) precoder may improve channel estimations performed by the UE 120. For example, the UE 120 may obtain more accurate channel estimations by including the estimated precoder in the channel estimation operations. For example, the UE 120 may be enabled to accurately estimate RF impairments associated with a signal, such as multi-transmit antenna NL, and/or I/Q impairments, among other examples. Additionally, the UE 120 may be enabled to improve a channel estimation when a transmitter (e.g., the network node 110) uses multiple transmit antennas. The improved channel estimation may reduce an EVM associated with signals transmitted by the network node 110, thereby improving a throughput associated with the signals.

Figure 5:
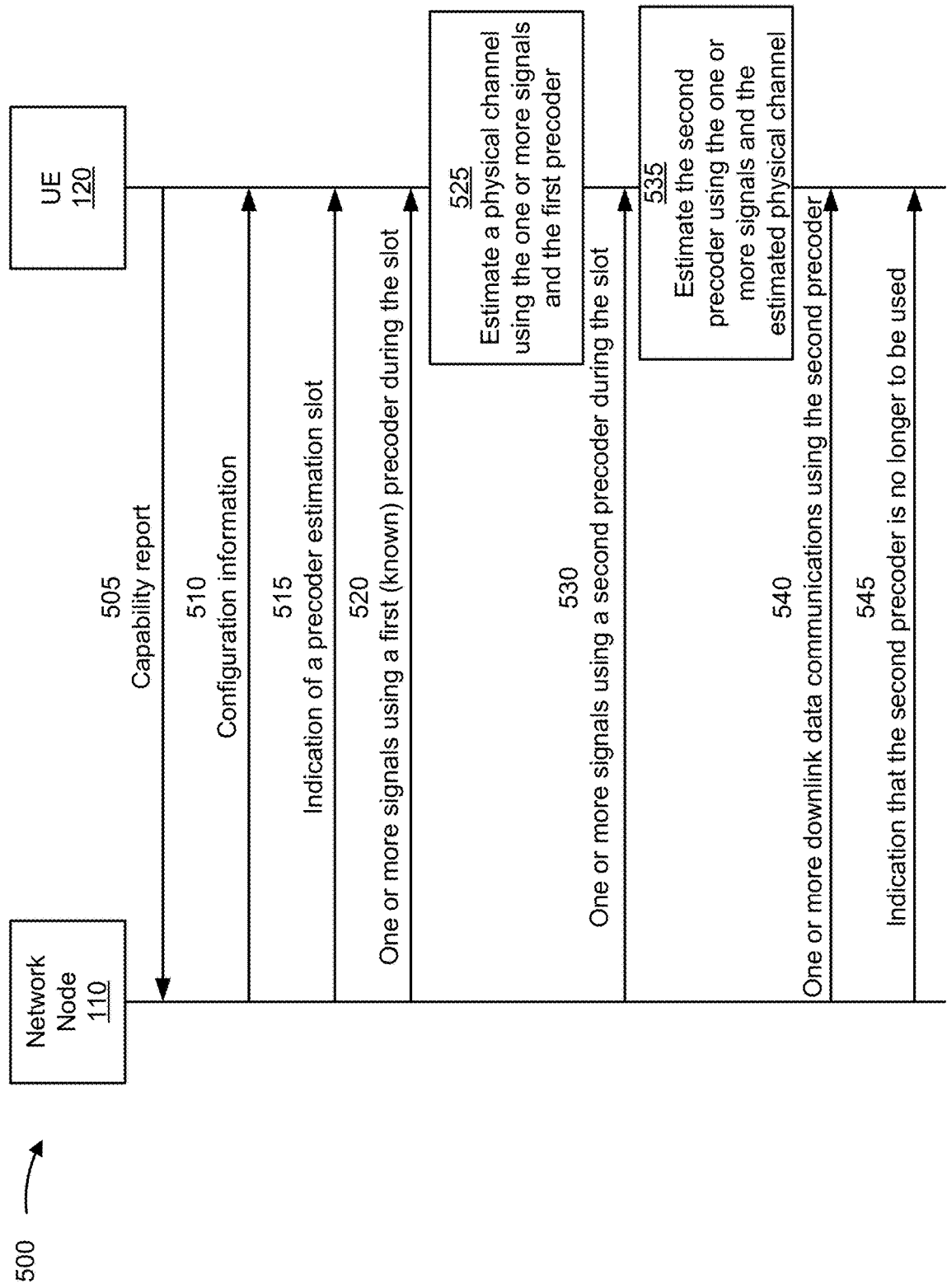
FIG. 5 is a diagram of an example associated with precoder estimation, in accordance with the present disclosure.

FIG. 5 is a diagram of an example 500 associated with precoder estimation, in accordance with the present disclosure. As shown in FIG. 5, a network node 110 (e.g., a base station, a CU, a DU, and/or an RU) may communicate with a UE 120. In some aspects, the network node 110 and the UE 120 may be part of a wireless network (e.g., the wireless network 100). The UE 120 and the network node 110 may have established a wireless connection prior to operations shown in FIG. 5.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU). As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

As shown by reference number 505, the UE 120 may transmit, and the network node 110 may receive, a capability report. The UE 120 may transmit the capability report via RRC signaling, uplink control information (UCI) signaling, a UE assistance information (UAI) communication, a physical uplink control channel (PUCCH), and/or a physical uplink shared channel (PUSCH), among other examples. In some aspects, the capability report may indicate UE support for performing precoder estimation, as described herein. For example, the capability report may indicate that the UE 120 supports a slot having a format associated with performing precoder estimation (e.g., referred to herein as a "precoder estimation slot" or a "special slot"), such as the slot depicted and described in more detail in connection with FIG. 6. In some aspects, the capability report may indicate that the UE 120 supports estimating a precoder (e.g., a non-codebook-based precoder) used by the network node 110. For example, the capability report may indicate that the UE 120 supports estimating a precoder based on a first one or more signals using a physical channel estimation (e.g., a channel matrix estimation) that is obtained from measuring a second one or more signals that are received by the UE 120 in the same slot (e.g., a precoder estimation slot) as the first one or more signals. In other words, the capability report may indicate that the UE 120 supports estimating a physical channel (e.g., using a known precoder or a codebook-based precoder that is used by the network node 110) and estimating a non-codebook-based precoder (e.g., using the estimation of the physical channel) in the same slot.

As shown by reference number 510, the network node 110 may transmit, and the UE 120 may receive, configuration information. In some aspects, the UE 120 may receive the configuration information via one or more of RRC signaling, one or more MAC control elements (MAC-CEs), and/or downlink control information (DCI), among other examples.

In some aspects, the configuration information may include an indication of one or more configuration parameters (e.g., stored by the UE 120 and/or previously indicated by the network node 110 or another network device) for selection by the UE 120, and/or explicit configuration information for the UE 120 to use to configure itself, among other examples.

In some aspects, the configuration information may indicate that the UE 120 is to perform precoder estimation, as described in more detail elsewhere herein. For example, the configuration information may indicate that the UE 120 is expected to support a slot format associated with performing precoder estimation (e.g., a precoder estimation slot or a special slot). In other words, the configuration information may indicate that the network node 110 is to transmit signals during a precoder estimation slot that are to be used by the UE 120 to estimate a precoder (e.g., a non-codebook-based precoder) used by the network node 110, as described in more detail elsewhere herein.

In some aspects, the configuration information may indicate the format of the precoder estimation slot. For example, the configuration information may indicate a quantity of symbols within the precoder estimation slot that are associated with a physical downlink control channel (PDCCH), a quantity of symbols within the precoder estimation slot that are associated with physical channel estimation, a quantity of symbols within the precoder estimation slot that are associated with precoder estimation, and/or a quantity of symbols within the precoder estimation that are associated with data (e.g., a physical downlink shared channel (PDSCH)), among other examples. In other aspects, the format of the precoder estimation slot may be defined, or otherwise fixed, by a wireless communication standard, such as the 3GPP. In such examples, the UE 120 and the network node 110 may store an indication of the format of the precoder estimation slot, and the configuration information may simply indicate that the precoder estimation slot is to be used by the network node 110 and the UE 120.

The UE 120 may configure itself based at least in part on the configuration information. In some aspects, the UE 120 may be configured to perform one or more operations described herein based at least in part on the configuration information.

As shown by reference number 515, the network node 110 may transmit, and the UE 120 may receive, an indication of a precoder estimation slot. For example, the network node 110 may transmit, and the UE 120 may receive, an indication of a slot to be associated with precoder estimation (e.g., the precoder estimation slot). In some aspects, the indication of the slot may include an indication of a first precoder (e.g., a codebook-based precoder) and one or more parameters associated with the precoder estimation slot. For example, the indication of the precoder estimation slot may indicate that the network node 110 is to transmit and/or schedule communications using a format associated with the precoder estimation slot in an upcoming (or current) slot.

In some aspects, the indication of the precoder estimation slot may be included in a control channel communication, such as a PDCCH communication. In some aspects, the network node 110 may transmit, and the UE 120 may receive, during the procedure estimation slot, a control channel communication including the indication of the slot (e.g., indicating that a current slot is to use a format associated with the precoder estimation slot). For example, a first one or more symbols of a slot may be associated with control channel communications (e.g., associated with the PDCCH). The network node 110 may transmit, and the UE 120 may receive, the indication of the precoder estimation slot in the PDCCH symbol(s) (e.g., in the first one or more symbols of the slot).

In other aspects, the indication of the precoder estimation slot may be included in a control channel communication or a MAC communication that is transmitted prior to the precoder estimation slot. For example, the network node 110 may transmit, and the UE 120 may receive, a control channel communication or a medium access control communication (e.g., one or more MAC-CEs) that includes the indication of the slot. For example, the indication of the precoder estimation slot may be included in a PDCCH communication of a slot that occurs prior to the precoder estimation slot. As another example, the network node 110 may transmit, and the UE 120 may receive, the indication of the precoder slot via MAC signaling (e.g., over a MAC layer) during a slot that occurs prior to the precoder estimation slot.

As described above, the indication of the precoder estimation slot may indicate one or more parameters associated with the slot. The one or more parameters may include an indication of a first precoder. The first precoder may be associated with one or more physical channel estimation symbols of the precoder estimation slot. In other words, during the one or more physical channel estimation symbols of the precoder estimation slot, the network node 110 may transmit one or more signals using the first precoder. The first precoder may be a codebook-based precoder. For example, the indication of the precoder estimation slot may include an indication of a codebook identifier (e.g., a codebook precoder number) associated with the first precoder. In some aspects, the one or more parameters may include an indication of a starting time of the precoder estimation slot. For example, the indication of the precoder estimation slot may include an indication of a slot arrival time (e.g., a quantity of slots at which the precoder estimation slot is to occur from a slot in which the indication of the precoder estimation slot is received by the UE 120). In some aspects, the indication of the precoder estimation slot may not include the indication of a starting time of the precoder estimation slot, such as when the indication of the precoder estimation slot is transmitted during the precoder estimation slot (e.g., during PDCCH symbols of the precoder estimation slot).

Additionally, or alternatively, the one or more parameters may include an indication of a first starting symbol, within the precoder estimation slot, associated with estimating the physical channel. For example, the indication of the precoder estimation slot may include an indication of a starting symbol for physical channel estimation to be performed by the UE 120 (e.g., may indicate that the second symbol in the slot is a first symbol to be associated with physical channel estimation). For example, the first starting symbol associated with estimating the physical channel may be a first symbol in which the network node is to transmit signal(s) using the first precoder (e.g., the codebook-based precoder). In some aspects, the one or more parameters may include an indication of a quantity of symbols, within the precoder estimation slot, to be associated with estimating the physical channel.

Additionally, or alternatively, the one or more parameters may include an indication of a second starting symbol, within the precoder estimation slot, associated with estimating a second precoder. For example, the second precoder may be a non-codebook-based precoder (e.g., that is to be used by the network node 110 for one or more future signals or communications). For example, the indication of the precoder estimation slot may include an indication of a starting symbol for precoder estimation (e.g., may indicate that the sixth symbol in the slot is a first symbol to be associated with precoder estimation). For example, the second starting symbol, within the precoder estimation slot, associated with estimating a second precoder may be a first symbol in which the network node is to transmit signal(s) using the second precoder (e.g., the non-codebook-based precoder). In some aspects, the one or more parameters may include an indication of a quantity of symbols, within the precoder estimation slot, to be associated with precoder estimation.

For example, the precoder estimation slot may be associated with a first one or more symbols associated with a control channel (e.g., a PDCCH), a second one or more symbols associated with estimating the physical channel (e.g., in which the network node 110 transmits one or more signals using a codebook-based precoder), and/or a third one or more symbols associated with estimating a second precoder (e.g., a non-codebook-based precoder). In other words, the precoder estimation slot may have a format that includes one or more PDCCH symbols, followed by physical channel estimation pilot symbols, followed by precoder estimation pilot symbols, followed by (e.g., optionally) PDSCH data symbols. The indication of the precoder estimation slot may indicate a timing, an order, and/or a format of the different symbols associated with the precoder estimation slot.

Additionally, or alternatively, the one or more parameters may include an indication of a third starting symbol, within the precoder estimation slot, associated with data communications (e.g., a PDSCH). In some aspects, the precoder estimation slot may not include any symbols associated with data communications (e.g., a PDSCH). However, in other examples, the precoder estimation slot may not include one or more symbols in which the network node 110 may transmit one or more data communications (e.g., that are received by the UE 120 via the PDSCH). For example, the network node 110 may transmit the one or more data communications using the second precoder (e.g., that is estimated by the UE 120 during the precoder estimation slot, as described in more detail elsewhere herein).

The network node 110 may transmit, and the UE 120 may receive, one or more signals during the precoder estimation slot. For example, as shown by reference number 520, the network node 110 may transmit, and the UE 120 may receive, a first one or more signals (e.g., reference signals) associated with estimating a physical channel using the first precoder (e.g., the known and/or codebook-based precoder). For example, the network node 110 may transmit the first one or more signals using the first precoder. The UE 120 may receive and/or measure the first one or more signals during physical channel estimation symbols of the precoder estimation slot.

For example, as shown by reference number 525, the UE 120 may estimate a physical channel (e.g., a physical channel matrix) using the first one or more signals and the first precoder (e.g., the codebook-based precoder). For example, the UE 120 may estimate the physical channel (e.g., rather than estimating the combined precoder and physical channel, such as the (H·P) of the channel) using the known precoder (e.g., the first precoder) and the known pilots (e.g., the first one or more signals). For example, the UE 120 may estimate a physical channel for each transmit antenna from multiple transmit antennas used by the network node 110 to transmit the first one or more signals.

For example, for a given transmit antenna of the network node 110, the UE 120 may estimate the physical channel for each subcarrier (e.g., each frequency domain resource) occupied by the first one or more signals. The UE 120 may estimate the physical channel using the first precoder based at least in part on a linear equation and using the received signals (e.g., $Y=(H \cdot P) \cdot S+N$, where Y is the received signal). For example, the received signal may be represented by a linear combination of the first precoder and the channel matrix for each transmit chain (e.g., each transmit antenna) of the network node 110 and for each subcarrier occupied by the first one or more signals. Knowing the first precoder (e.g., the codebook-based precoder), the UE 120 may use the linear equation to estimate a physical channel matrix representing an estimated physical channel in each subcarrier and for each transmit antenna. The UE 120 may use the estimated physical channel matrix to estimate a non-codebook-based precoder (e.g., the second precoder), as described in more detail elsewhere herein.

As shown by reference number 530, the network node 110 may transmit, and the UE 120 may receive, a second one or more signals (e.g., reference signals) associated with estimating the second precoder using the estimated physical channel (e.g., during the precoder estimation slot). For example, the network node 110 may transmit the second one or more signals using the second precoder (e.g., a non-codebook-based precoder). The UE 120 may receive and/or measure the second one or more signals during precoder estimation symbols of the precoder estimation slot. For example, the UE 120 may estimate, using the first precoder, the physical channel based on the first one or more reference signals, to obtain the estimated physical channel (e.g., as described above). As shown by reference number 535, the UE 120 may estimate, using the estimated physical channel, the second precoder based on the second one or more signals.

For example, the UE 120 may estimate the second precoder for a precoder resource group (e.g., one or more subcarriers or frequency domain resources over which the precoder is the same or constant). For example, for a given subcarrier within a precoder resource group, $Y=(H \cdot P) \cdot S+N$, where Y is the received signal, H is the estimated physical channel matrix (e.g., estimated by the UE 120 during the one or more physical channel estimation symbols of the precoder estimation slot), P is the precoder (e.g., precoding matrix), S is the pilots (e.g., multi-layer pilots transmitted by the network node 110) and N is a noise vector. For example, using the known (e.g., estimated) physical channel matrix, the precoder (e.g., P) can be estimated by the UE 120 using the received signal(s) during the precoder estimation symbols of the precoding estimation slot. For example, the received signal for a given subcarrier of the precoder resource group may be represented as $(S^T \otimes H) \cdot \tilde{P}+N$, where $S^T$ is a pilot signal for a given layer or transmit antenna, P is the precoder to be estimated, and $\otimes$ represents a Kronecker product. The UE 120 may estimate the second precoder (e.g., $\tilde{P}$) using a linear minimum mean square error (LMMSE) technique or a least square (LS) technique, among other examples. In some aspects, a condition associated with enabling the UE 120 to estimate the precoder may be that $Prg \cdot N_{rx} \geq N_{tx} \cdot N_{ss}$, where Prg is a quantity of subcarriers included in the precoder resource group, $N_{rx}$ is a quantity of receive antennas used by the UE 120, $N_{tx}$ is a quantity of transmit antennas used by the network node 110, and $N_{ss}$ is a quantity of layers (e.g., MIMO layers).

In some aspects, the UE 120 may use the quantity of transmit antennas used by the network node 110 to estimate the physical channel and/or the second precoder. The UE 120 may receive, from the network node 110, an indication of the quantity of transmit antennas used by the network node 110. In other aspects, the UE 120 may determine the quantity of transmit antennas used by the network node 110 based at least in part on the first precoder (e.g., that is indicated by the network node 110 as part of indicating the information associated with the precoder estimation slot). For example, a size of the precoding matrix may indicate the quantity of transmit antennas used by the network node 110.

As shown by reference number 540, the network node 110 may transmit, and the UE 120 may receive, one or more downlink data communications using the second precoder. In other words, the UE 120 may receive one or more signals based on the second precoder (e.g., using the estimated second precoder for channel estimations associated with the one or more signals). For example, the network node 110 may transmit the one or more downlink data communications using the second precoder that is used by the network node 110 during the one or more precoder estimation symbols of the precoder estimation slot. The UE 120 may assume that the network node 110 is using the second precoder for the one or more downlink data communications (e.g., until the UE 120 receives a signal indicating that the second precoder is no longer used, as described in more detail below).

The UE 120 may estimate, using the estimated second precoder, values associated with one or more RF impairments associated with the one or more downlink data communications received by the UE 120. For example, the UE 120 may perform NL estimation and/or cancellation for each transmit antenna of the network node 110 using the estimated second precoder. As another example, the UE 120 may perform I/Q impairment estimation and/or correction using the estimated second precoder. In other words, the UE 120 may be enabled to perform improved multi-layer or multi-transmit antenna channel estimation based at least in part on using the estimated second precoder to perform the channel estimation.

As shown by reference number 545, the network node 110 may transmit, and the UE 120 may receive, an indication that the second precoder is no longer to be used by the network node 110. For example, the network node 110 may transmit, and the UE 120 may receive, an indication of another slot associated with precoder estimation (e.g., an indication that another precoder estimation slot is upcoming). Therefore, the UE 120 may determine that the second precoder is no longer to be used and another precoder is to be estimated by the UE 120 (e.g., based on the other precoder estimation slot). As another example, the network node 110 may transmit, and the UE 120 may receive, an indication to stop the use of the second precoder (e.g., a precoder obsolescence notice). The UE 120 may refrain from using the second precoder for processing signals associated with the network node 110 based at least in part on receiving the indication that the second precoder is no longer to be used by the network node 110.

As a result, the UE 120 is able to obtain an estimation of the precoder (e.g., the precoding matrix) being used by the network node 110 (e.g., when the precoder is a non-codebook-based precoder). The estimation of the (non-codebook-based) precoder may improve channel estimations performed by the UE 120. For example, the UE 120 may obtain more accurate channel estimations by including the estimated precoder in the channel estimation operations. For example, the UE 120 may be enabled to accurately estimate RF impairments associated with a signal, such as multi-transmit antenna NL, and/or I/Q impairments, among other examples. Additionally, the UE 120 may be enabled to improve a channel estimation when a transmitter (e.g., the network node 110) uses multiple transmit antennas. The improved channel estimation may reduce an EVM associated with signals transmitted by the network node 110, thereby improving a throughput associated with the signals.

As indicated above, FIG. 5 is provided as an example. Other examples may differ from what is described with respect to FIG. 5.

Figure 6:
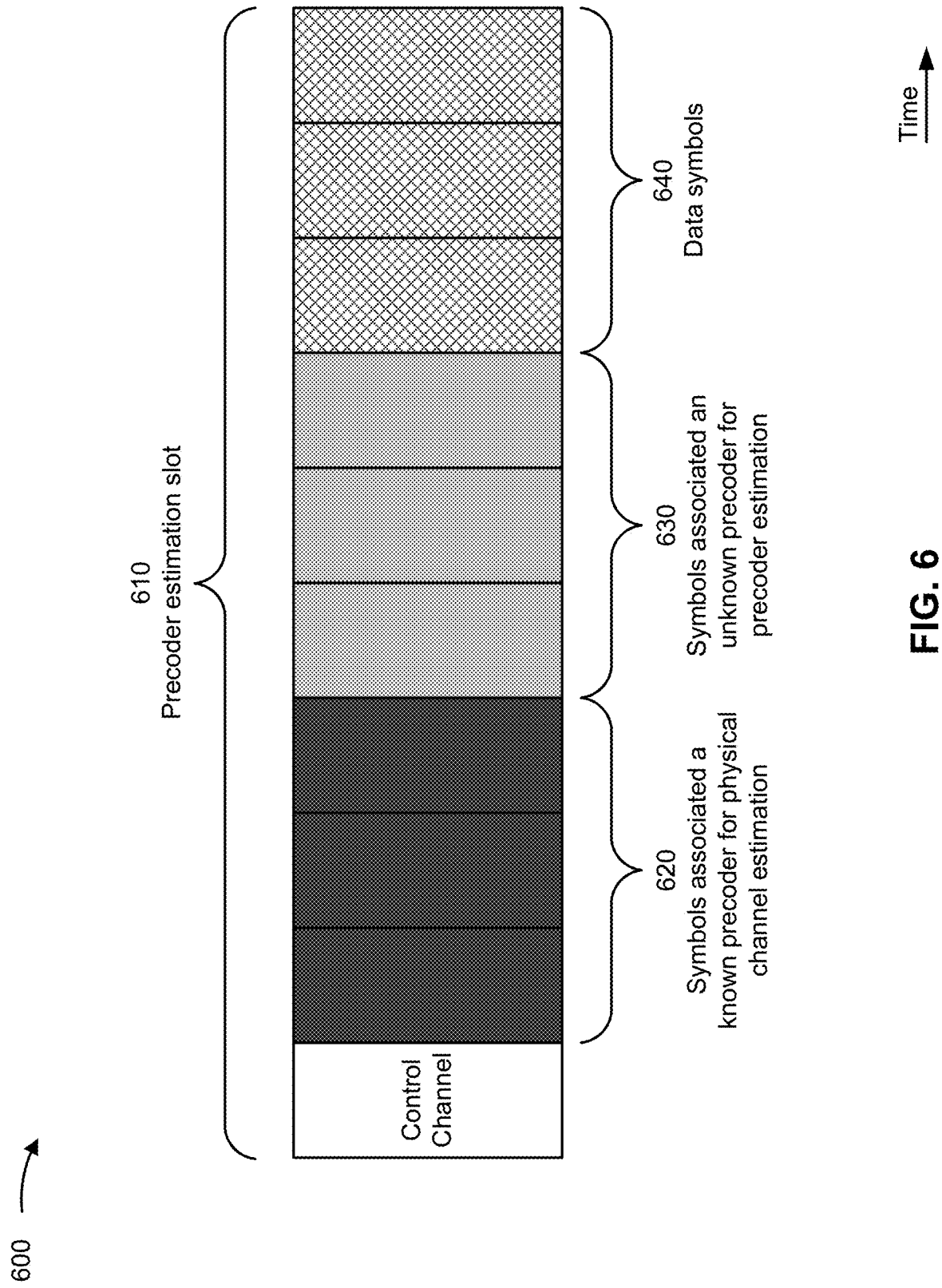
FIG. 6 is a diagram of an example associated with a slot format for precoder estimation, in accordance with the present disclosure.

FIG. 6 is a diagram of an example 600 associated with a slot format for precoder estimation, in accordance with the present disclosure. FIG. 6 shows an example format of a precoder estimation slot 610. As shown in FIG. 6, the precoder estimation slot 610 may include one or more symbols associated with a control channel (e.g., a PDCCH). In some aspects, one or more parameters of the precoder estimation slot 610 may be signaled by the network node 110 to the UE 120 in the one or more symbols associated with the control channel, as described in more detail elsewhere herein.

The precoder estimation slot 610 may include one or more symbols 620 associated with physical channel estimation. For example, the one or more symbols 620 may be associated with a known precoder used by the network node 110 (e.g., known to the UE 120). For example, the known precoder may be a codebook-based precoder that is indicated to the UE 120. The one or more symbols 620 may occur after (e.g., in the time domain) the one or more symbols associated with the control channel. As described in more detail elsewhere herein, the UE 120 may estimate a physical channel (e.g., a physical channel matrix for a multi-layer or multi-transmit antenna channel) using signal(s) received during the one or more symbols 620 (e.g., based at least in part on the known precoder).

The precoder estimation slot 610 may include one or more symbols 630 associated with precoder estimation. The one or more symbols 630 may occur after the one or more symbols 620 in the time domain. The one or more symbols 630 may be associated with an unknown (e.g., to the UE 120) precoder. For example, the unknown precoder may be a non-codebook-based precoder. In other words, the network node 110 may transmit one or more signals using the non-codebook-based precoder during the one or more symbols 630. The UE 120 may estimate the non-codebook-based precoder using the signal(s) received during the one or more symbols 630 and using the estimated physical channel (e.g., that is estimated using the signal(s) received during the one or more symbols 620), as described in more detail elsewhere herein.

In some aspects, the precoder estimation slot 610 may include one or more data symbols 640. In other aspects, the precoder estimation slot 610 may not include the one or more data symbols 640. The one or more data symbols 640 may be associated with a PDSCH. The network node 110 may transmit one or more signals during the one or more data symbols 640 using the same precoder that was used by the network node during the one or more symbols 630. For example, the network node 110 may transmit one or more signals during the one or more data symbols 640 using the non-codebook-based precoder that was estimated by the UE 120. Therefore, the UE 120 may use the estimated precoder to perform channel estimations and/or RF impairment corrections or cancellations on the signal(s) transmitted during the one or more data symbols 640 (e.g., to improve an EVM and/or throughput associated with the signal(s)).

As indicated above, FIG. 6 is provided as an example. Other examples may differ from what is described with respect to FIG. 6.

Figure 7:
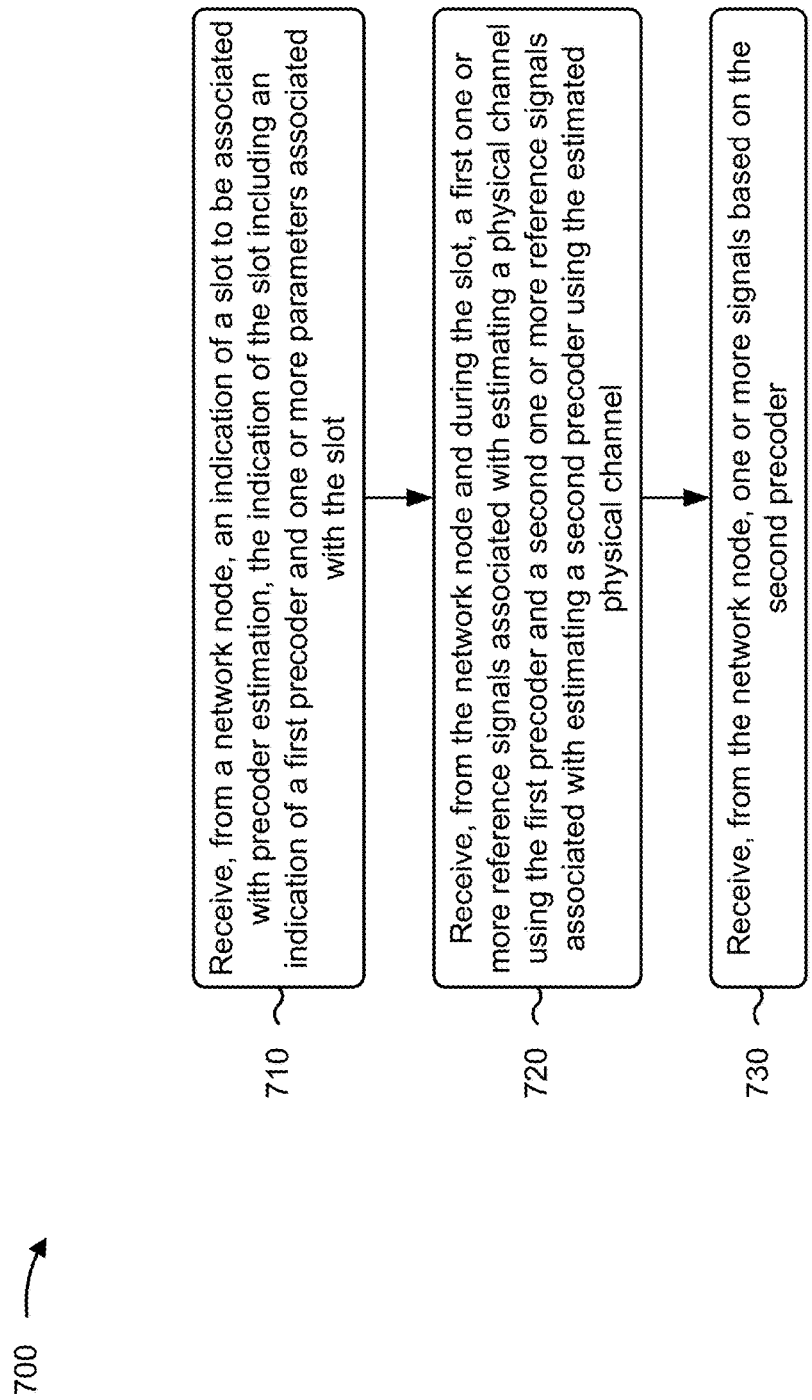
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with precoder estimation.

As shown in FIG. 7, in some aspects, process 700 may include receiving, from a network node, an indication of a slot to be associated with precoder estimation, the indication of the slot including an indication of a first precoder and one or more parameters associated with the slot (block 710). For example, the UE (e.g., using communication manager 140 and/or reception component 902, depicted in FIG. 9) may receive, from a network node, an indication of a slot to be associated with precoder estimation, the indication of the slot including an indication of a first precoder and one or more parameters associated with the slot, as described above.

As further shown in FIG. 7, in some aspects, process 700 may include receiving, from the network node and during the slot, a first one or more reference signals associated with estimating a physical channel using the first precoder and a second one or more reference signals associated with estimating a second precoder using the estimated physical channel (block 720). For example, the UE (e.g., using communication manager 140 and/or reception component 902, depicted in FIG. 9) may receive, from the network node and during the slot, a first one or more reference signals associated with estimating a physical channel using the first precoder and a second one or more reference signals associated with estimating a second precoder using the estimated physical channel, as described above.

As further shown in FIG. 7, in some aspects, process 700 may include receiving, from the network node, one or more signals based on the second precoder (block 730). For example, the UE (e.g., using communication manager 140 and/or reception component 902, depicted in FIG. 9) may receive, from the network node, one or more signals based on the second precoder, as described above.

Process 700 may include additional aspects, such as any single aspect or any combination of aspects described below and/or in connection with one or more other processes described elsewhere herein.

In a first aspect, receiving the indication of the slot includes receiving, during the slot, a control channel communication including the indication of the slot.

In a second aspect, alone or in combination with the first aspect, receiving the indication of the slot includes receiving a control channel communication or a medium access control communication that includes the indication of the slot.

In a third aspect, alone or in combination with one or more of the first and second aspects, the indication of the first precoder includes an indication of a codebook identifier associated with the first precoder.

In a fourth aspect, alone or in combination with one or more of the first through third aspects, the one or more parameters associated with the slot include an indication of a timing of the slot.

In a fifth aspect, alone or in combination with one or more of the first through fourth aspects, the one or more parameters include at least one of an indication of a starting time of the slot, an indication of a first starting symbol, within the slot, associated with estimating the physical channel, an indication of a second starting symbol, within the slot, associated with estimating the second precoder, or an indication of a third starting symbol, within the slot, associated with data communications.

In a sixth aspect, alone or in combination with one or more of the first through fifth aspects, the slot is associated with a first one or more symbols associated with a control channel, a second one or more symbols associated with estimating the physical channel, and a third one or more symbols associated with estimating the second precoder.

In a seventh aspect, alone or in combination with one or more of the first through sixth aspects, receiving the one or more signals based on the second precoder includes estimating, using the second precoder, values associated with one or more radio frequency impairments associated with the one or more signals.

In an eighth aspect, alone or in combination with one or more of the first through seventh aspects, process 700 includes receiving, from the network node, an indication of another slot associated with precoder estimation or an indication to stop a use of the second precoder, and refraining from using the second precoder for processing signals associated with the network node.

In a ninth aspect, alone or in combination with one or more of the first through eighth aspects, process 700 includes estimating, using the first precoder, the physical channel based on the first one or more reference signals, to obtain the estimated physical channel, and estimating, using the estimated physical channel, the second precoder based on the second one or more reference signals.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
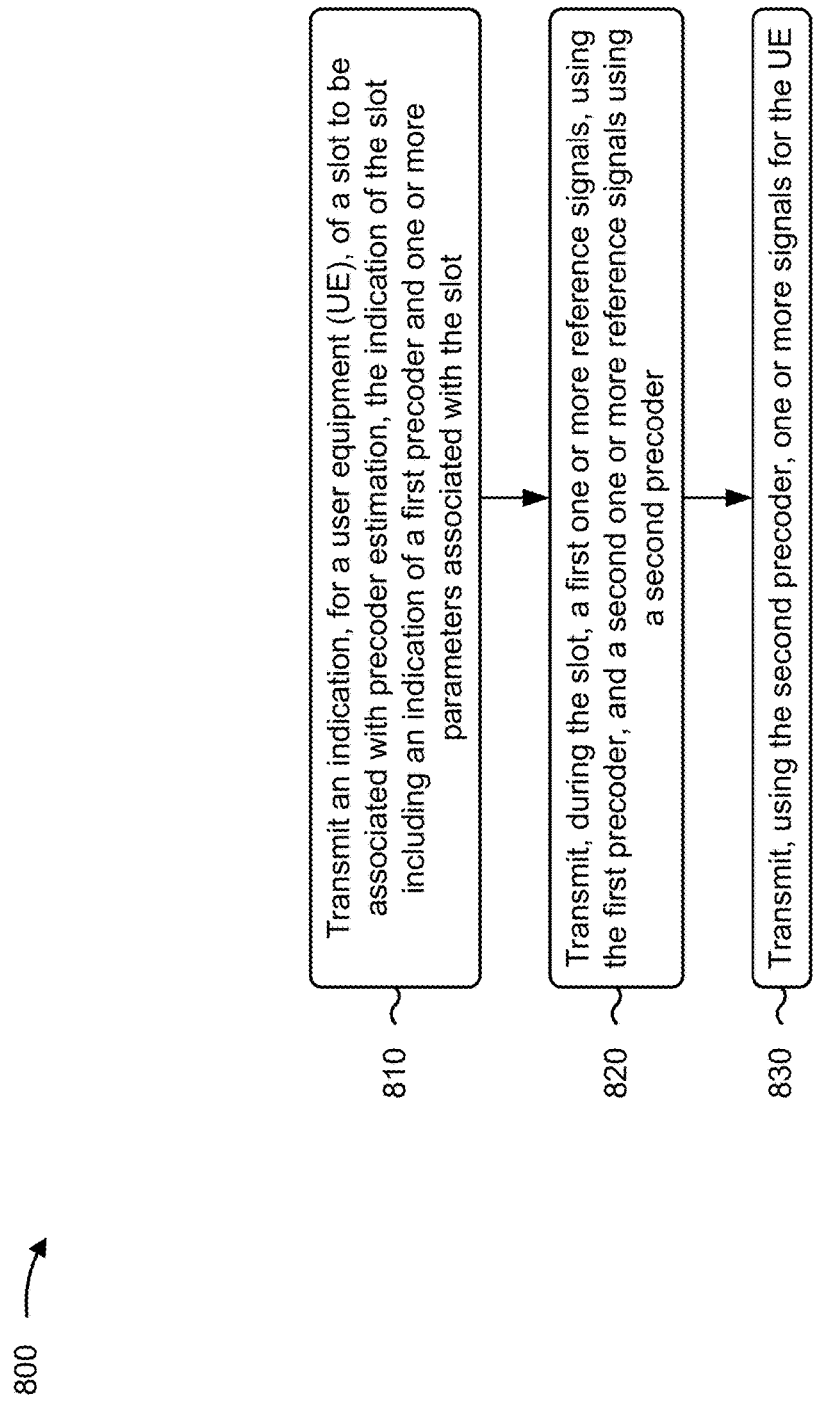
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with precoder estimation.

As shown in FIG. 8, in some aspects, process 800 may include transmitting an indication, for a UE, of a slot to be associated with precoder estimation, the indication of the slot including an indication of a first precoder and one or more parameters associated with the slot (block 810). For example, the network node (e.g., using communication manager 150 and/or transmission component 1004, depicted in FIG. 10) may transmit an indication, for a UE, of a slot to be associated with precoder estimation, the indication of the slot including an indication of a first precoder and one or more parameters associated with the slot, as described above.

As further shown in FIG. 8, in some aspects, process 800 may include transmitting, during the slot, a first one or more reference signals, using the first precoder, and a second one or more reference signals using a second precoder (block 820). For example, the network node (e.g., using communication manager 150 and/or transmission component 1004, depicted in FIG. 10) may transmit, during the slot, a first one or more reference signals, using the first precoder, and a second one or more reference signals using a second precoder, as described above.

As further shown in FIG. 8, in some aspects, process 800 may include transmitting, using the second precoder, one or more signals for the UE (block 830). For example, the network node (e.g., using communication manager 150 and/or transmission component 1004, depicted in FIG. 10) may transmit, using the second precoder, one or more signals for the UE, as described above.

Process 800 may include additional aspects, such as any single aspect or any combination of aspects described below and/or in connection with one or more other processes described elsewhere herein.

In a first aspect, transmitting the indication of the slot includes transmitting, during the slot, a control channel communication including the indication of the slot.

In a second aspect, alone or in combination with the first aspect, transmitting the indication of the slot includes transmitting a control channel communication or a medium access control communication that includes the indication of the slot.

In a third aspect, alone or in combination with one or more of the first and second aspects, the indication of the first precoder includes an indication of a codebook identifier associated with the first precoder.

In a fourth aspect, alone or in combination with one or more of the first through third aspects, the one or more parameters associated with the slot include an indication of a timing of the slot.

In a fifth aspect, alone or in combination with one or more of the first through fourth aspects, the one or more parameters include at least one of an indication of a starting time of the slot, an indication of a first starting symbol, within the slot, associated with estimating a physical channel, an indication of a second starting symbol, within the slot, associated with estimating the second precoder, or an indication of a third starting symbol, within the slot, associated with data communications.

In a sixth aspect, alone or in combination with one or more of the first through fifth aspects, the slot is associated with a first one or more symbols associated with a control channel, a second one or more symbols associated with estimating a physical channel, and a third one or more symbols associated with estimating the second precoder.

In a seventh aspect, alone or in combination with one or more of the first through sixth aspects, process 800 includes transmitting an indication, for the UE, of another slot associated with precoder estimation or an indication to stop a use of the second precoder.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
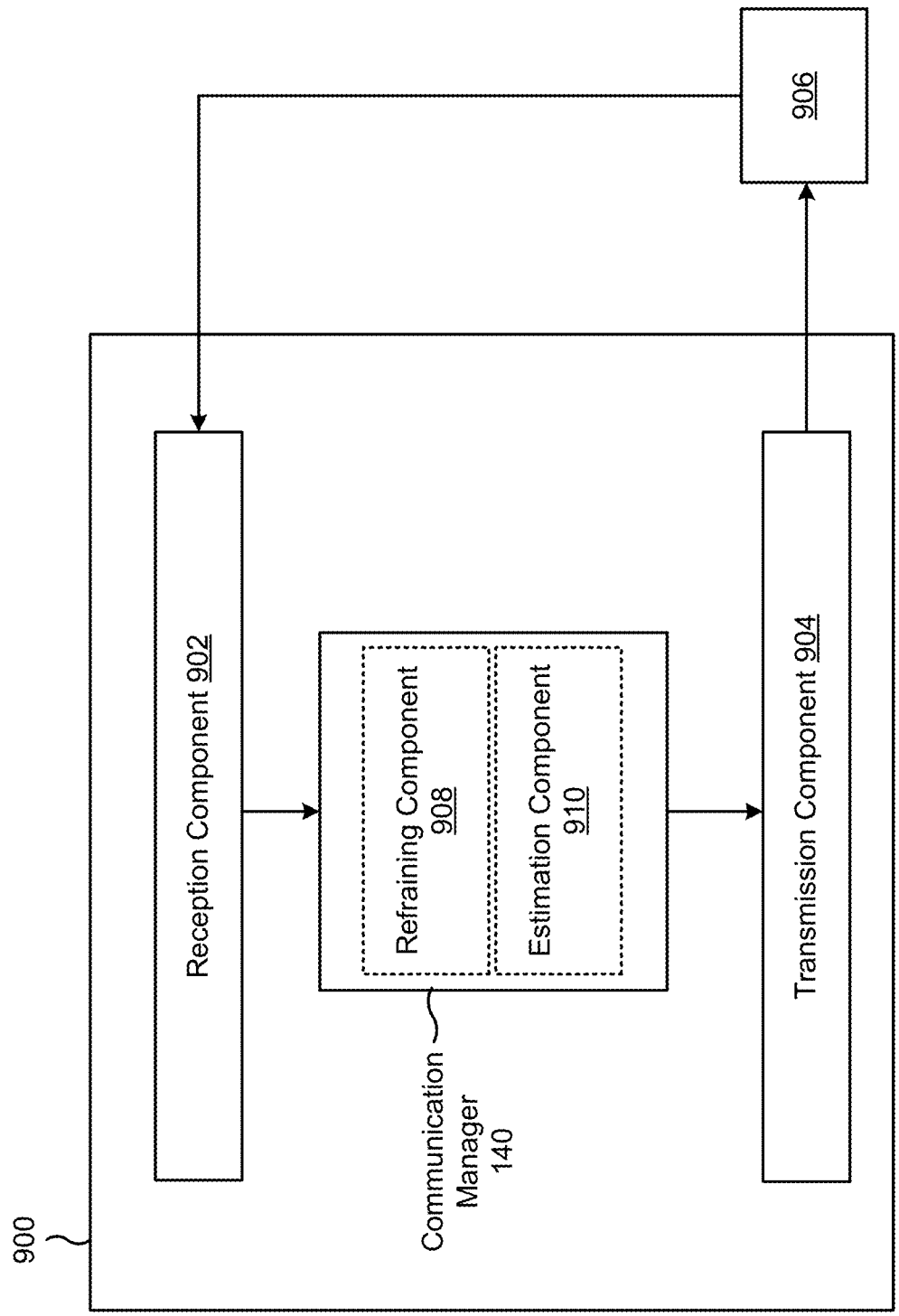
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a refraining component 908, and/or an estimation component 910, among other examples.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network node, an indication of a slot to be associated with precoder estimation, the indication of the slot including an indication of a first precoder and one or more parameters associated with the slot. The reception component 902 may receive, from the network node and during the slot, a first one or more reference signals associated with estimating a physical channel using the first precoder and a second one or more reference signals associated with estimating a second precoder using the estimated physical channel. The reception component 902 may receive, from the network node, one or more signals based on the second precoder.

The reception component 902 may receive, from the network node, an indication of another slot associated with precoder estimation or an indication to stop a use of the second precoder.

The refraining component 908 may refrain from using the second precoder for processing signals associated with the network node.

The estimation component 910 may estimate, using the first precoder, the physical channel based on the first one or more reference signals, to obtain the estimated physical channel.

The estimation component 910 may estimate, using the estimated physical channel, the second precoder based on the second one or more reference signals.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
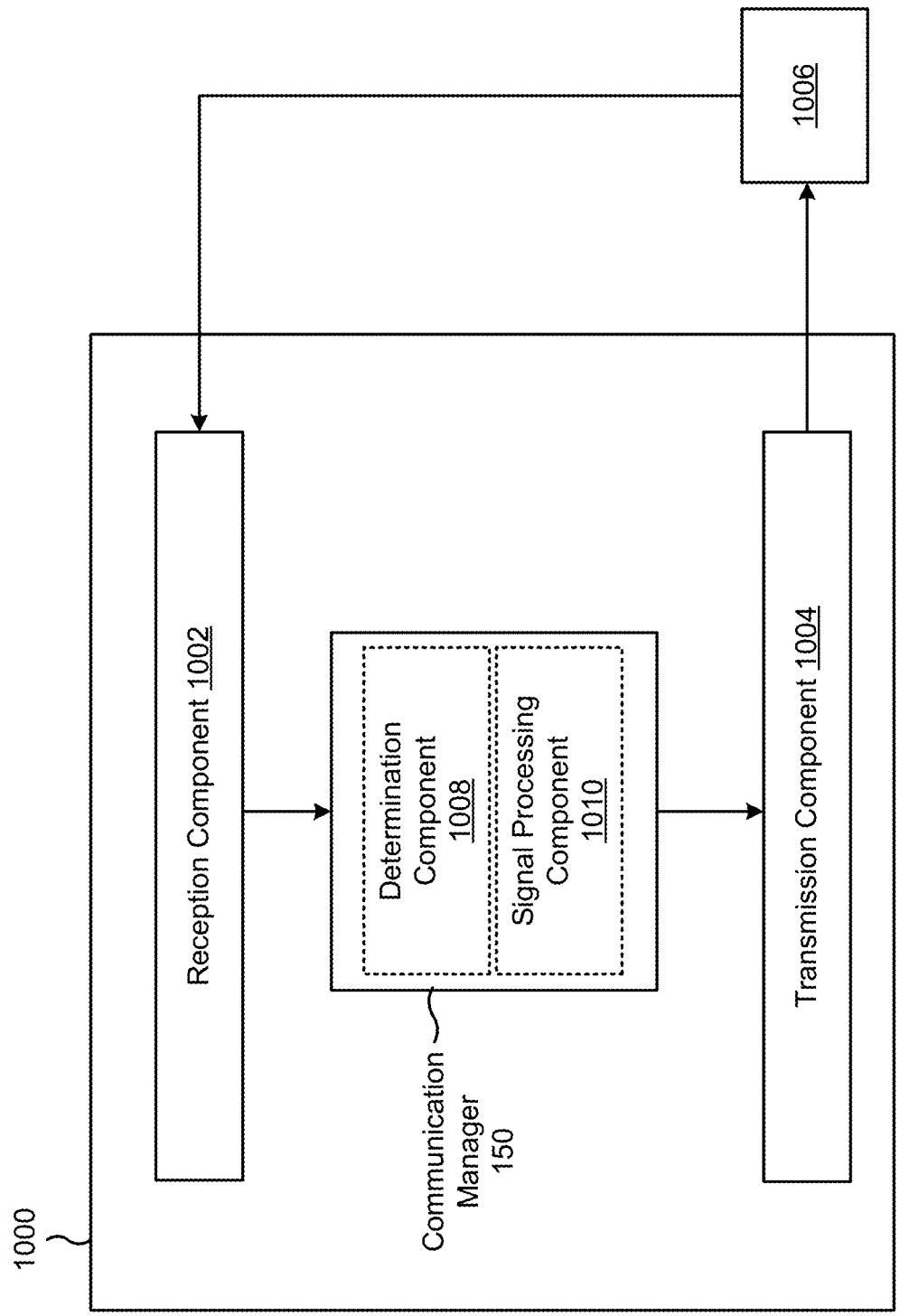
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a determination component 1008, and/or a signal processing component 1010, among other examples.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit an indication, for a UE, of a slot to be associated with precoder estimation, the indication of the slot including an indication of a first precoder and one or more parameters associated with the slot. The transmission component 1004 may transmit, during the slot, a first one or more reference signals, using the first precoder, and a second one or more reference signals using a second precoder. The transmission component 1004 may transmit, using the second precoder, one or more signals for the UE.

The transmission component 1004 may transmit an indication, for the UE, of another slot associated with precoder estimation or an indication to stop a use of the second precoder.

The determination component 1008 may determine the first precoder and/or the second precoder. The signal processing component 1010 may process the first one or more reference signals using the first precoder. The signal processing component 1010 may process the second one or more reference signals using the second precoder.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network node, an indication of a slot to be associated with precoder estimation, the indication of the slot including an indication of a first precoder and one or more parameters associated with the slot; receiving, from the network node and during the slot, a first one or more reference signals associated with estimating a physical channel using the first precoder and a second one or more reference signals associated with estimating a second precoder using the estimated physical channel; and receiving, from the network node, one or more signals based on the second precoder.

Aspect 2: The method of Aspect 1, wherein receiving the indication of the slot comprises: receiving, during the slot, a control channel communication including the indication of the slot.

Aspect 3: The method of any of Aspects 1-2, wherein receiving the indication of the slot comprises: receiving a control channel communication or a medium access control communication that includes the indication of the slot.

Aspect 4: The method of any of Aspects 1-3, wherein the indication of the first precoder includes an indication of a codebook identifier associated with the first precoder.

Aspect 5: The method of any of Aspects 1-4, wherein the one or more parameters associated with the slot include an indication of a timing of the slot.

Aspect 6: The method of any of Aspects 1-5, wherein the one or more parameters include at least one of: an indication of a starting time of the slot, an indication of a first starting symbol, within the slot, associated with estimating the physical channel, an indication of a second starting symbol, within the slot, associated with estimating the second precoder, or an indication of a third starting symbol, within the slot, associated with data communications.

Aspect 7: The method of any of Aspects 1-6, wherein the slot is associated with a first one or more symbols associated with a control channel, a second one or more symbols associated with estimating the physical channel, and a third one or more symbols associated with estimating the second precoder.

Aspect 8: The method of any of Aspects 1-7, wherein receiving the one or more signals based on the second precoder comprises: estimating, using the second precoder, values associated with one or more radio frequency impairments associated with the one or more signals.

Aspect 9: The method of any of Aspects 1-8, further comprising: receiving, from the network node, an indication of another slot associated with precoder estimation or an indication to stop a use of the second precoder; and refraining from using the second precoder for processing signals associated with the network node.

Aspect 10: The method of any of Aspects 1-9, further comprising: estimating, using the first precoder, the physical channel based on the first one or more reference signals, to obtain the estimated physical channel; and estimating, using the estimated physical channel, the second precoder based on the second one or more reference signals.

Aspect 11: A method of wireless communication performed by a network node, comprising: transmitting an indication, for a user equipment (UE), of a slot to be associated with precoder estimation, the indication of the slot including an indication of a first precoder and one or more parameters associated with the slot; transmitting, during the slot, a first one or more reference signals, using the first precoder, and a second one or more reference signals using a second precoder; and transmitting, using the second precoder, one or more signals for the UE.

Aspect 12: The method of Aspect 11, wherein transmitting the indication of the slot comprises: transmitting, during the slot, a control channel communication including the indication of the slot.

Aspect 13: The method of any of Aspects 11-12, wherein transmitting the indication of the slot comprises: transmitting a control channel communication or a medium access control communication that includes the indication of the slot.

Aspect 14: The method of any of Aspects 11-13, wherein the indication of the first precoder includes an indication of a codebook identifier associated with the first precoder.

Aspect 15: The method of any of Aspects 11-14, wherein the one or more parameters associated with the slot include an indication of a timing of the slot.

Aspect 16: The method of any of Aspects 11-15, wherein the one or more parameters include at least one of: an indication of a starting time of the slot, an indication of a first starting symbol, within the slot, associated with estimating a physical channel, an indication of a second starting symbol, within the slot, associated with estimating the second precoder, or an indication of a third starting symbol, within the slot, associated with data communications.

Aspect 17: The method of any of Aspects 11-16, wherein the slot is associated with a first one or more symbols associated with a control channel, a second one or more symbols associated with estimating a physical channel, and a third one or more symbols associated with estimating the second precoder.

Aspect 18: The method of any of Aspects 11-17, further comprising: transmitting an indication, for the UE, of another slot associated with precoder estimation or an indication to stop a use of the second precoder.

Aspect 19: An apparatus for wireless communication at a device, comprising a processor; memory coupled with the processor; and instructions stored in the memory and executable by the processor to cause the apparatus to perform the method of one or more of Aspects 1-10.

Aspect 20: A device for wireless communication, comprising a memory and one or more processors coupled to the memory, the one or more processors configured to perform the method of one or more of Aspects 1-10.

Aspect 21: An apparatus for wireless communication, comprising at least one means for performing the method of one or more of Aspects 1-10.

Aspect 22: A non-transitory computer-readable medium storing code for wireless communication, the code comprising instructions executable by a processor to perform the method of one or more of Aspects 1-10.

Aspect 23: A non-transitory computer-readable medium storing a set of instructions for wireless communication, the set of instructions comprising one or more instructions that, when executed by one or more processors of a device, cause the device to perform the method of one or more of Aspects 1-10.

Aspect 24: An apparatus for wireless communication at a device, comprising a processor; memory coupled with the processor; and instructions stored in the memory and executable by the processor to cause the apparatus to perform the method of one or more of Aspects 11-18.

Aspect 25: A device for wireless communication, comprising a memory and one or more processors coupled to the memory, the one or more processors configured to perform the method of one or more of Aspects 11-18.

Aspect 26: An apparatus for wireless communication, comprising at least one means for performing the method of one or more of Aspects 11-18.

Aspect 27: A non-transitory computer-readable medium storing code for wireless communication, the code comprising instructions executable by a processor to perform the method of one or more of Aspects 11-18.

Aspect 28: A non-transitory computer-readable medium storing a set of instructions for wireless communication, the set of instructions comprising one or more instructions that, when executed by one or more processors of a device, cause the device to perform the method of one or more of Aspects 11-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a network node, an indication of a slot to be associated with precoder estimation, the indication of the slot including an indication of a first precoder and one or more parameters associated with the slot;
      receive, from the network node and during the slot, a first one or more reference signals associated with estimating a physical channel using the first precoder and a second one or more reference signals associated with estimating a second precoder using the estimated physical channel; and
      receive, from the network node, one or more signals based on the second precoder.

2. The UE of claim 1, wherein the one or more processors, to receive the indication of the slot, are configured to:
   receive, during the slot, a control channel communication including the indication of the slot.

3. The UE of claim 1, wherein the one or more processors, to receive the indication of the slot, are configured to:
   receive a control channel communication or a medium access control communication that includes the indication of the slot.

4. The UE of claim 1, wherein the indication of the first precoder includes an indication of a codebook identifier associated with the first precoder.

5. The UE of claim 1, wherein the one or more parameters include at least one of:
   an indication of a starting time of the slot,
   an indication of a first starting symbol, within the slot, associated with estimating the physical channel,
   an indication of a second starting symbol, within the slot, associated with estimating the second precoder, or
   an indication of a third starting symbol, within the slot, associated with data communications.

6. The UE of claim 1, wherein the slot is associated with a first one or more symbols associated with a control channel, a second one or more symbols associated with estimating the physical channel, and a third one or more symbols associated with estimating the second precoder.

7. The UE of claim 1, wherein the one or more processors, to receive the one or more signals based on the second precoder, are configured to:

estimate, using the second precoder, values associated with one or more radio frequency impairments associated with the one or more signals.

8. The UE of claim 1, wherein the one or more processors are further configured to:
receive, from the network node, an indication of another slot associated with precoder estimation or an indication to stop a use of the second precoder; and
refrain from using the second precoder for processing signals associated with the network node.

9. The UE of claim 1, wherein the one or more processors are further configured to:
estimate, using the first precoder, the physical channel based on the first one or more reference signals, to obtain the estimated physical channel; and
estimate, using the estimated physical channel, the second precoder based on the second one or more reference signals.

10. A network node for wireless communication, comprising:
a memory; and
one or more processors, coupled to the memory, configured to:
transmit an indication, for a user equipment (UE), of a slot to be associated with precoder estimation, the indication of the slot including an indication of a first precoder and one or more parameters associated with the slot;
transmit, during the slot, a first one or more reference signals, using the first precoder, and a second one or more reference signals using a second precoder; and
transmit, using the second precoder, one or more signals for the UE.

11. The network node of claim 10, wherein the one or more processors, to transmit the indication of the slot, are configured to:
transmit, during the slot, a control channel communication including the indication of the slot.

12. The network node of claim 10, wherein the one or more processors, to transmit the indication of the slot, are configured to:
transmit a control channel communication or a medium access control communication that includes the indication of the slot.

13. The network node of claim 10, wherein the indication of the first precoder includes an indication of a codebook identifier associated with the first precoder.

14. The network node of claim 10, wherein the one or more parameters associated with the slot include an indication of a timing of the slot.

15. The network node of claim 10, wherein the one or more processors are further configured to:
transmit an indication, for the UE, of another slot associated with precoder estimation or an indication to stop a use of the second precoder.

16. A method of wireless communication performed by a user equipment (UE), comprising:
receiving, from a network node, an indication of a slot to be associated with precoder estimation, the indication of the slot including an indication of a first precoder and one or more parameters associated with the slot;
receiving, from the network node and during the slot, a first one or more reference signals associated with estimating a physical channel using the first precoder and a second one or more reference signals associated with estimating a second precoder using the estimated physical channel; and
receiving, from the network node, one or more signals based on the second precoder.

17. The method of claim 16, wherein receiving the indication of the slot comprises:
receiving, during the slot, a control channel communication including the indication of the slot.

18. The method of claim 16, wherein receiving the indication of the slot comprises:
receiving a control channel communication or a medium access control communication that includes the indication of the slot.

19. The method of claim 16, wherein the indication of the first precoder includes an indication of a codebook identifier associated with the first precoder.

20. The method of claim 16, wherein the one or more parameters associated with the slot include an indication of a timing of the slot.

21. The method of claim 16, wherein the one or more parameters include at least one of:
an indication of a starting time of the slot,
an indication of a first starting symbol, within the slot, associated with estimating the physical channel,
an indication of a second starting symbol, within the slot, associated with estimating the second precoder, or
an indication of a third starting symbol, within the slot, associated with data communications.

22. The method of claim 16, wherein the slot is associated with a first one or more symbols associated with a control channel, a second one or more symbols associated with estimating the physical channel, and a third one or more symbols associated with estimating the second precoder.

23. The method of claim 16, wherein receiving the one or more signals based on the second precoder comprises:
estimating, using the second precoder, values associated with one or more radio frequency impairments associated with the one or more signals.

24. The method of claim 16, further comprising:
estimating, using the first precoder, the physical channel based on the first one or more reference signals, to obtain the estimated physical channel; and
estimating, using the estimated physical channel, the second precoder based on the second one or more reference signals.

25. A method of wireless communication performed by a network node, comprising:
transmitting an indication, for a user equipment (UE), of a slot to be associated with precoder estimation, the indication of the slot including an indication of a first precoder and one or more parameters associated with the slot;
transmitting, during the slot, a first one or more reference signals, using the first precoder, and a second one or more reference signals using a second precoder; and
transmitting, using the second precoder, one or more signals for the UE.

26. The method of claim 25, wherein transmitting the indication of the slot comprises:
transmitting, during the slot, a control channel communication including the indication of the slot.

27. The method of claim 25, wherein transmitting the indication of the slot comprises:
transmitting a control channel communication or a medium access control communication that includes the indication of the slot.

28. The method of claim 25, wherein the indication of the first precoder includes an indication of a codebook identifier associated with the first precoder.

29. The method of claim 25, wherein the one or more parameters associated with the slot include an indication of a timing of the slot.

30. The method of claim 25, wherein the one or more parameters include at least one of:
- an indication of a starting time of the slot,
- an indication of a first starting symbol, within the slot, associated with estimating a physical channel,
- an indication of a second starting symbol, within the slot, associated with estimating the second precoder, or
- an indication of a third starting symbol, within the slot, associated with data communications.

* * * * *